United States Patent [19]

Turner

[11] 3,780,559

[45] Dec. 25, 1973

[54] SHEET FEEDING

[75] Inventor: Leslie Ashton Steele Turner, Sutton, England

[73] Assignee: Airfix Industries Limited, London, England

[22] Filed: Oct. 4, 1971

[21] Appl. No.: 186,229

[30] Foreign Application Priority Data
Oct. 5, 1970 Great Britain.................. 47,318/70
Jan. 21, 1971 Great Britain..................... 2,846/71

[52] U.S. Cl...................... 72/361, 72/428, 93/36.1, 425/109
[51] Int. Cl.......................................... B21d 43/16
[58] Field of Search.................. 425/129, 126, 109, 425/112; 93/36.01, 36.05, 36.1; 214/1 S; 271/23, 41, 44, 64; 72/60, 361, 428

[56] References Cited
UNITED STATES PATENTS
| | | | |
|---|---|---|---|
| 3,167,044 | 1/1965 | Henrickson............................ | 72/349 |
| 985,607 | 2/1911 | Kramer................................. | 271/23 |
| 1,955,819 | 4/1934 | Maul..................................... | 271/64 |
| 2,959,812 | 11/1960 | Allen.................................... | 425/109 |
| 3,178,497 | 4/1965 | Moscicki.............................. | 425/112 |
| 2,411,082 | 11/1946 | Conti.................................... | 72/348 |
| 1,864,479 | 6/1932 | Ware.................................... | 93/36.1 |

Primary Examiner—Richard J. Herbst
Attorney—Samuel Scrivener, Jr. et al.

[57] ABSTRACT

A foil loading mechanism for use with an injection moulding machine producing containers having foil side wall, the mechanism comprises a body forming the peripheral wall of a cavity for receiving and retaining a foil in deformed condition, an aperture in the wall extending longitudinally of the cavity, guide means for guiding a foil into a position overlying the aperture and means for driving a foil overlying the aperture through the aperture and into the cavity. The foil in the cavity is then driven from the cavity in a longitudinal direction into a female mould cavity in register with the loaded cavity. Thereafter the male core is inserted into the female cavity and material injected into the mould cavity defined therebetween.

25 Claims, 14 Drawing Figures

SHEET FEEDING

This invention is concerned with improvements in and relating to foil loading mechanisms particularly for use in machinery for the production of containers.

Containers can be produced by an injection moulding machine in which a male and female die define a cavity which is the shape of the wall and base of the container, synthetic plastics material being injected into the cavity to fill it and thereby form the wall and base. Certain advantages can be achieved by making the wall from a flexible sheet material which can be printed in the flat and then loaded into the cavity. There then remains a base cavity, a seam cavity and, if desired, a lip cavity into which material is injected to complete the container and bind the edges of the foil together. Also in the case of container which are formed wholly by injection moulding it may be desirable to locate foil in a tool cavity to form a decoration in the moulded article.

Whilst reference has been made to making containers, it is to be understood that the invention has application to location of flexible material in moulds so as to extend wholly or partly around the cavity whether this defines a container or other article. Other articles which readily spring to mind are lids where a peripheral skirt portion may be a foil.

Whilst reference has been made to foil it is to be understood that where this term is used throughout this specification it is intended to cover flexible materials of various thicknesses and of various materials such as synthetic plastics, paper, board, metal foil and includes permeable as well as impermeable materials, such as foraminous materials for use in making filters.

According to this invention there is provided a foil loading mechanism which comprises a body forming a peripheral wall of a cavity for receiving and retaining a foil in distorted condition, the wall extending about the longitudinal axis of the cavity, an aperture in the wall extending longitudinally of the cavity, guide means to position a foil with a part of one major face of the foil overlying the aperture and a drive means operable on said foil part to drive the foil into the cavity.

In order that the invention may be well understood there will now be described some embodiments, given by way of example, reference being had to the accompanying drawings in which.

Figures 1A, 1B:
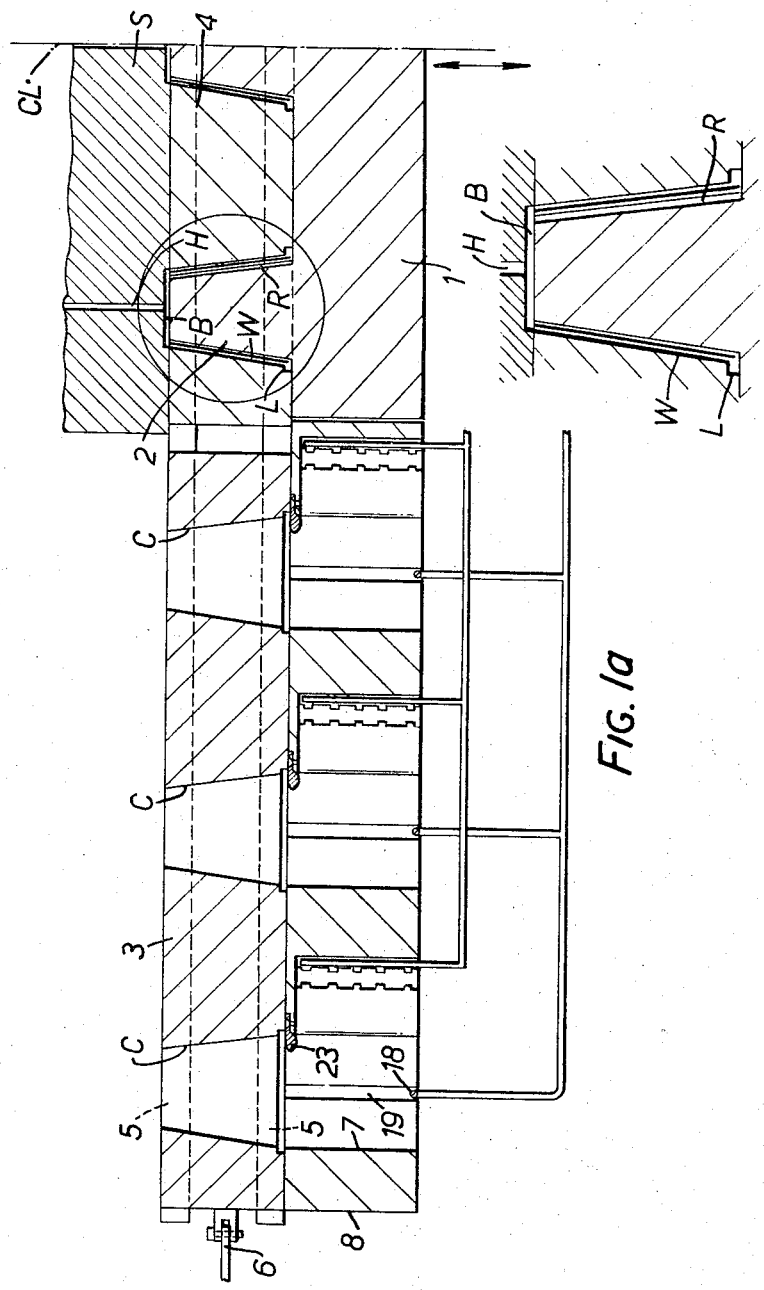
FIGS. 1a and 1b are horizontal sections showing part of a foil loading mechanism in relation to a female multi-impression tool, displaceable between a foil receiving station and an injection moulding station.

In FIG. 1 is shown in schematic form a half of an injection moulding machine to one side of the machine centre line CL. A multi-impression male tool 1, carrying six cores 2, is movable backwards and forwards on the machine centre line CL by well known mechanism requiring no further description. A pair of female tools 3, 4 is provided, each of which is displaceable transversely of the centre line CL along rails 5 by a drive which preferably is a crank, one on each side of the machine coupled by a link 6 to one of the female tools. Each female tool has six cavities C corresponding to the six cores and when a female tool, tool 4 in FIG. 1, is in the machine on the centre line, the cores 2 are advanced into the cavities to define between the tools six cavities, a part W of each of which is annular to define a frusto-conical container wall, a part R of which defines a rib from end to end of the wall cavity W, a part L of which defines a lip for the container and part B of which conforms to the closed end of the container. This is here shown in part defined by a static part S of the female tool.

The annular frusto-conical wall of the container is to be made of a resilient foil and to load this foil into each female tool cavity the female tool when moved to one side of the machine, tool 3 in FIG. 1, has its cavities in register with guide cavities 7 of a guide body 8 of which there is one on each side of the machine. Thus when one female tool is out of the machine for loading with foil, the other, loaded with foils is moved in the machine for injection moulding during which synthetic plastics material is forced from a feed spure H into the base cavity B, thence along the rib cavity R to the lip cavity L, the foil occupying the wall cavity W. When the injection is complete the container has a foil wall, a moulded lip, a foil joining seam and a base. The male tool retracts taking the containers with it and these are ejected from the cores in well known manner. The female tool is removed to one side of the machine and replaced by the other female tool, now loaded with foils and the cycle is repeated.

The loading of a female tool with foils when the tool is outside the moulding machine is carried out by extracting foils F from a magazine 9 in which a pack of foils is held with each of the foils in a vertical plane parallel to the machine centre line. The extracted foils are dropped down guideways 10 (FIG. 2) of which there is one for each guide body cavity 7, the guideways terminating in closed ended passages 11 in the guide body. Each closed passage 11 intersects a recess 12 communicating with a cavity 7 of which a peripheral wall 13 is defined by the body 8, of which the ends are open and which has an aperture 14 extending longitudinally of the cavity peripheral wall, this aperture placing the cavity in communication with the recess 12. In respect of each recess there is an actuator 15 here in the form of a rod, the rods all being coupled together to move in unison along their respective recesses and across their respective cavities. In operation a foil F is delivered to each passage 11 where it is arrested with a major face overlying the respective aperture. The respective actuator rod 15 advances from the blind end of its recess and engages the major face of the foil remote from the aperture 14. The actuator rod forces the part of the foil overlying the aperture 14 through that aperture and into the cavity, where the foil by its own resilience will spring radially and lie, in a deformed condition, against the surface of the cavity peripheral wall, free edges of the foil being juxtaposed and located adjacent the aperture. A foil is shown in full line in the passage 11 of the upper right hand cavity of FIG. 2 and in broken line in the deformed condition in upper right hand cavity of FIG. 2. The actuator rod withdraws to its recess and an ejector member 18 advances axially of the cavity. The member 18 spans the cavity and is received by channels 19 so that the ejector member engages the adjacent axially directed foil edge. The foil will advance axially out of the guide body cavity into the registering tool cavity, when it will lie against the tool cavity peripheral wall.

Figure 5:
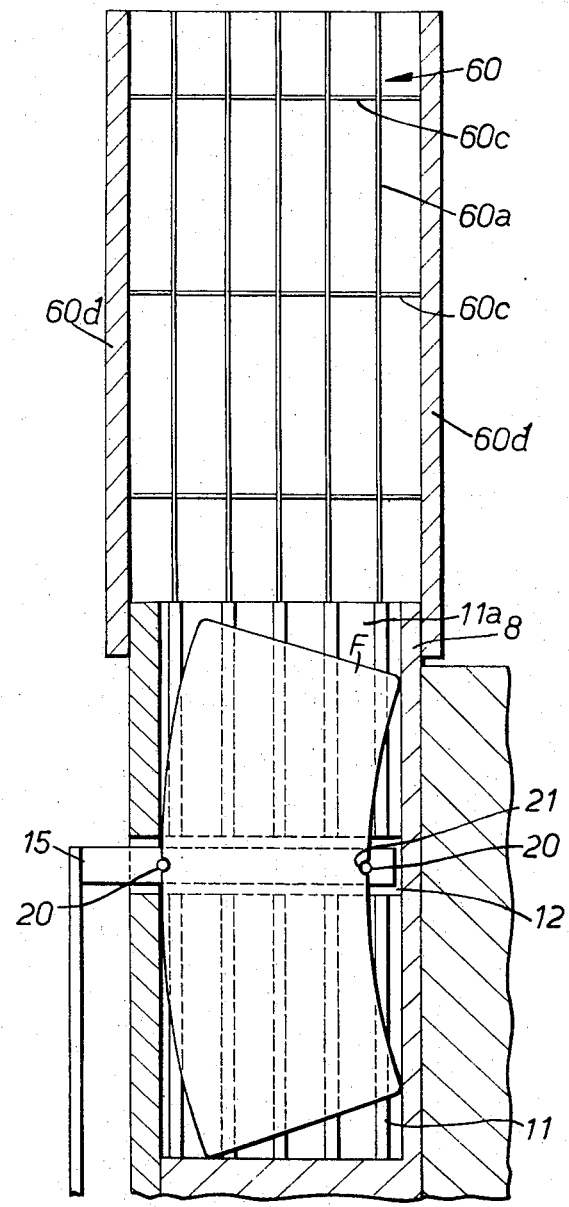
FIG. 5 is a section on the line V—V of FIG. 2.

To assist in accurately locating the juxtaposed longitudinal foil edges, the actuator rods 15 have pins 20 spaced to engage recesses 21 (FIG. 5) in the foil edges as the rod moves toward the foil arrested in the associated blind ended passage 11. The foil will then not displace angularly about the cavity axis if one part of the foil to one side of the rod offers greater resistance to passage through the aperture 14 than the other part of the foil to the other side of the rod. To further assist in positioning the foil, a guide block 23 is set adjacent the exit from each guide body cavity. This is substantially torpedo shaped in elevation when viewed from the cavity axis, the blunt end directed away from the exit. This assists in guiding the juxtaposed edges to their proper position in the tool cavity, and in register with rib cavity R on the core.

The magazine 9 includes side walls 32, 33, backup member 34 and base guides 35, 36. The foils are retained in the magazine by lips 37 extending from the side walls 32, 33 and are biased against the lips 37 by the biasing action of the back-up member 34. As shown the bias on the member 34 is provided by connecting it to a counterweight (not shown) attached to the end of a cord 39 extending forwardly from the lower end of member 34 between the base guides 35, 36 over a roller 40 or similar guide means and rearwardly to an aperture 41 in magazine base 42.

Other means may alternatively be used to bias the member 34, for example a spring or jack.

The member 34 is mounted for movement in the magazine by carriages 44 fixed thereto and from which two rollers 45 extend into slots 46 in side wall 32 and 33 of the magazine.

Foils are removed from the magazine by a suction pick-up member 50 provided with sucker pads 51 connectable to a source of vacuum and a source of pressure as will appear. The member 50 is movable from a position between lips 37 to one of six positions in which it is in register with one of six channels 52 to 57 defined by lips 58.

Channels 52 to 57 represent the sides of individual passages and each such passage is prolonged below the magazine by wires 60. The wires of each passage comprise two sets 60a 60b, the wires in each set being parallel to one another and defining one side of a guideway or chute 61, the wires in the set being spaced apart by spacer wires 60c and each set being parallel with the other set. Each pair of parallel sets extends between a pair of walls 60d, preferably transparent, which define the narrow ends of each guideway or chute 10. Each pair of sets will deliver a foil to a closed ended passage 11. The spaced wires of each set provide guide surfaces for the foils which are continuous in the direction of foil travel but spaced apart transversely of the direction of travel thereby reducing friction. Likewise passages 11 are preferably grooved at 11a parallel to the direction of foil travel for the same purpose.

In operation the member 50 is moved to a position adjacent the magazine. In this position suction is applied to pads 51 so that the leading foil in the stack is engaged. Thereafter the member 50 is moved, for example, to a position in register with channel 52. The suction is then removed and the foil, released by a small positive pressure, drops down channel 52 under gravity between two parallel sets of wires defining a chute 10 into passage 11. The member 50 is then moved back to the magazine to pick up another foil and then into register with channel 53 to deposit the foil. This is repeated until a foil has been deposited in each channel 52 to 57. Thereafter the cycle is repeated in reverse or in the same direction.

As shown, the member 50 is driven by a lobed cam shown diagrammatically at 70. The member 50 is supported by two rods 71, 72 fixed to a plate 73 which in turn is supported by two rods 74, 75 mounted in bearings 76, 77 on the magazine side wall 33. The free ends of the rods 74, 75 are connected by a member 78 in which a cam follower 79 is rotatably mounted. The cam 70 is rotatably mounted on the side wall 33 of the magazine and is driven by a pinion 80 and rack 81. The rack may be reciprocated by a pneumatic jack (not shown).

To ensure that the cam follower 79 maintains contact with the cam 70, a bias is applied to the member 50 towards the magazine. The bias is provided by a pneumatic jack 73a which is permanently energised.

The application of suction to the pick-up pads 51 is controlled by a valve 51a mounted on one side wall of the magazine and operated by a follower 51b.

Follower 51b is responsive to auxiliary cam surfaces 51c on cam 70 and actuates valve 51a to couple pads 51 to a vacuum source as member 50 arrives adjacent the leading foil in the magazine and when the member 50 is at a position set by the outermost edge of a lobe of cam 70 follower 51b will couple the pads through the same valve to a source of positive pressure. Beside follower 51b is a follower 82b responsive to cam surfaces 82c which will control connection of blower jets 82 on member 50 to a source of positive pressure. The control is such that the jets will operate when the member 50 is positioned by the outer edge of a lobe to blow a foil, released by the pads, down into the guideway defined by wires 60 over which the member 50 is positioned by a lobe of cam 70. One of cam surfaces 51c and 82c carries a ridge (not shown) which will cut off the vacuum pads and the blower jets when the cam has completed one cycle and all cavities 7 are loaded.

In order to ensure that the stock of foils in the magazine abuts lips 37 after the member 50 has moved up to the stock and removed one foil, a piston/cylinder combination 85 on the member 34 engages a thrust block 86 ahead of member 34, a pulse of pressure being fed to the piston/cylinder combination as the member 50 moves away from the stock to expand the piston/cylinder combination and nudge the stock toward the lips 37.

Figure 6:
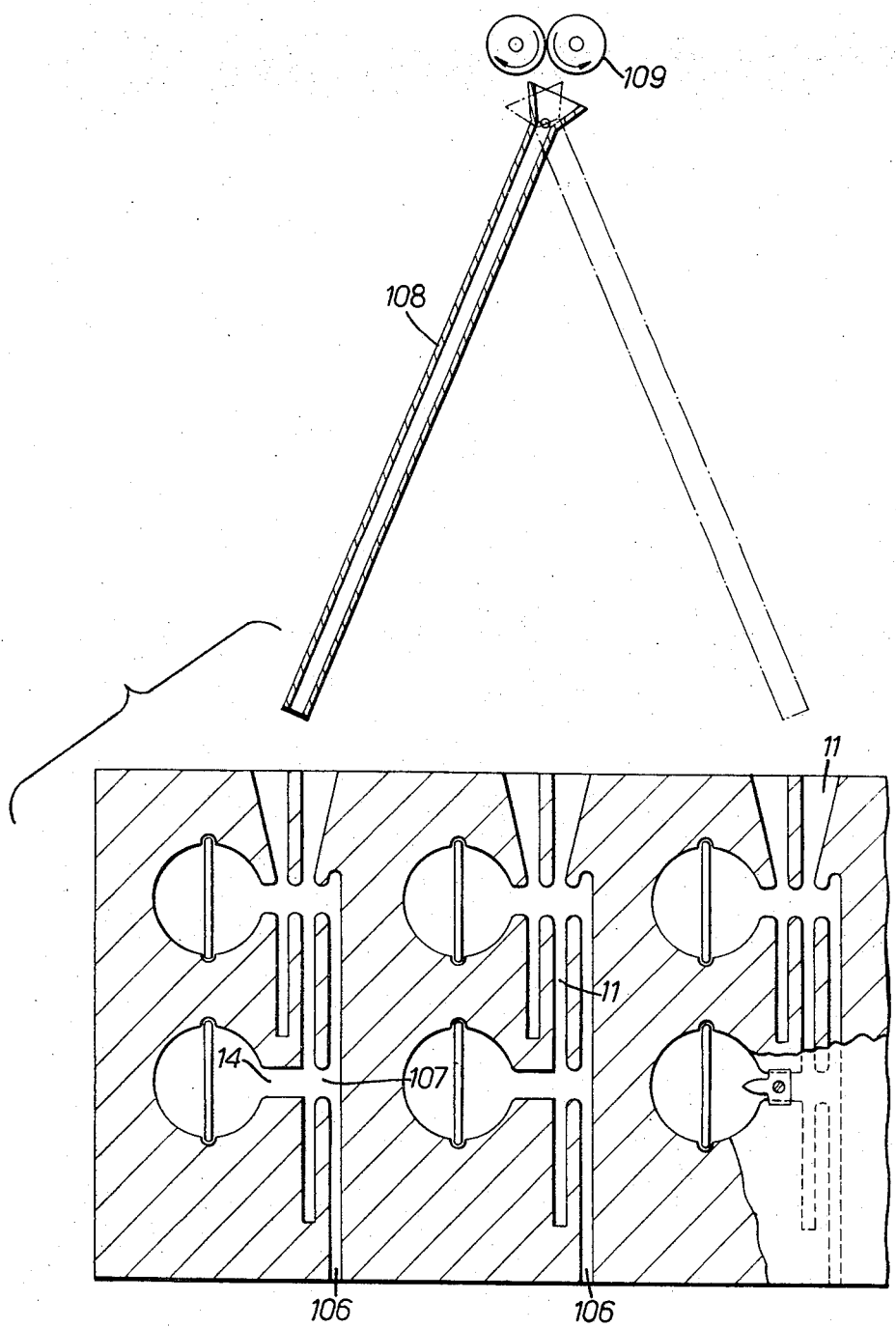
FIG. 6 is an elevation of an alternative loading mechanism body and foil distributor.

In the embodiment shown in FIG. 6 the drive means for moving a foil from a passage 11 into a guide body cavity comprises an air passage 106 having a port 107 opposite an aperture 14. Also in place of wires defining individual guideways or chutes for each passage 11, a pivoted chute 108 is provided to which individual foils are fed by roller 109.

Figure 7:
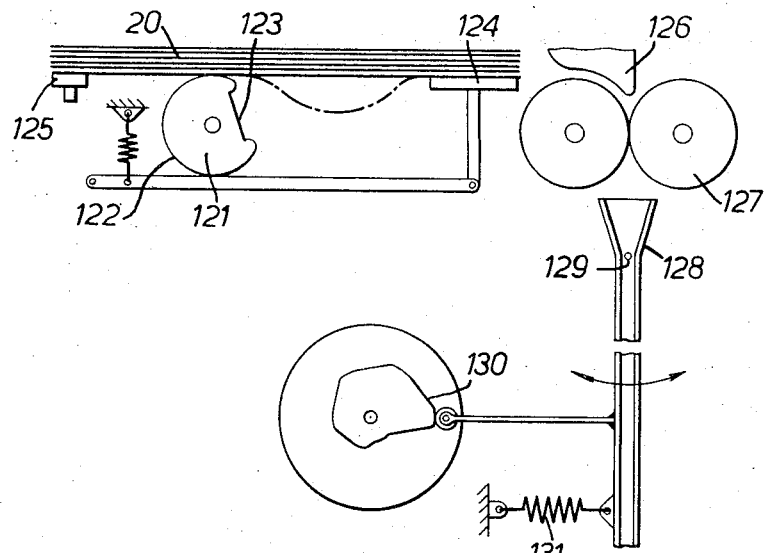
FIGS. 7 and 8 are alternative foil feeders.
Figure 8:
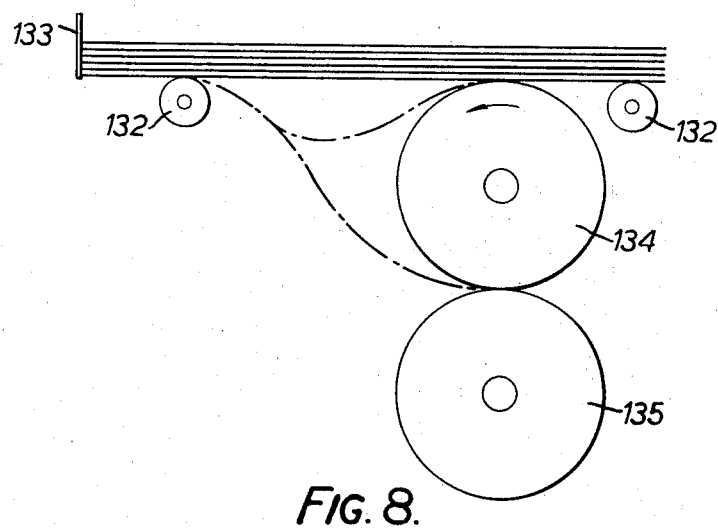

Alternative means of extracting individual foils from a stock of foils are shown in FIGS. 7 and 8. In FIG. 7 a roller 121 has a foil gripping surface 122, such as of O-rings each stretched from a pin on a flat 123, over the curved surface and on to another pin on the flat. This roller bears on the lowermost foil. A gripper pad 124 also bears on the lowermost foil. When the roller 121 is rotated, the lowest foil bows, a retainer pad 125 having first been moved away from the foils. At a predetermined angular position of the roller 121, the pad 124 is driven down, e.g. by a cam on the shaft of the roller 121 while the retainer pad moves up. The bowed foil drives between the lowered pad 124 and foils above it, the retainer pad holds up the foil stack and the leading edge of the driven foil moves by way of guide 126 to drive rollers 127, which feed to a chute 128 angularly displaceable about a pin 129 by a cam 130 against the bias of a spring 131. The roller 121 for a six-position cam will rotate six times for each revolution of the chute cam 130. Alternatively the roller 121 may be larger and be set to dispense six foils per complete revolution in which case the roller and cam 130 are on a 1:1 ratio. Suitable drives couple the roller, drive rolls and cam shaft and are not shown.

In FIG. 8 an alternative foil feed is shown where the foils rest on rollers 132 and abut a stop 133. A drive roller 134 will rotate anti-clockwise as shown and bow the lowest foil which will be released from above that roller and by its resilience spring the leading edge to a nip between roller 134 and a roller 135. Suitable timing would be provided as for FIG. 7.

Figure 2:
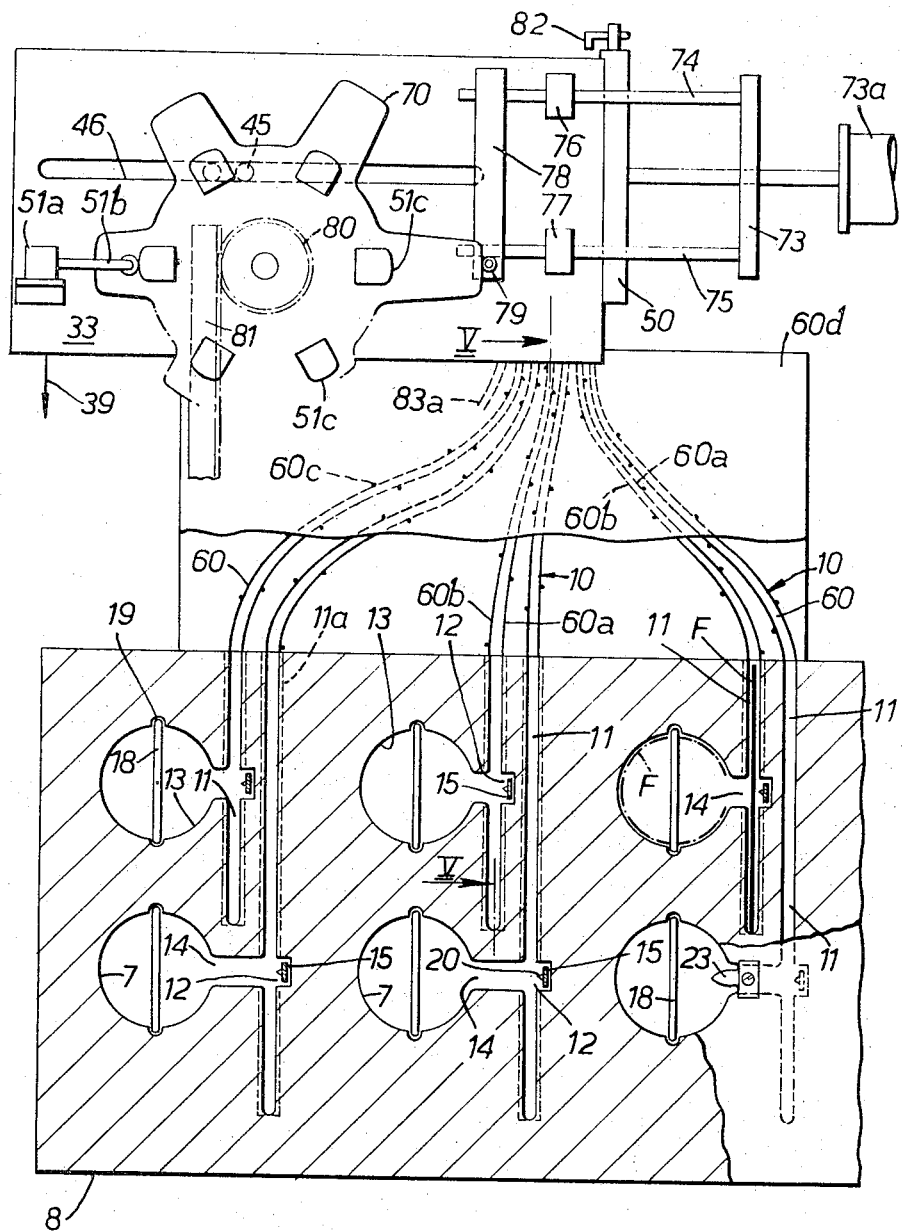
FIG. 2 is a diagrammatic elevation, as viewed from the ejection face, of the loading mechanism body and foil feeder mechanism.
Figure 3:
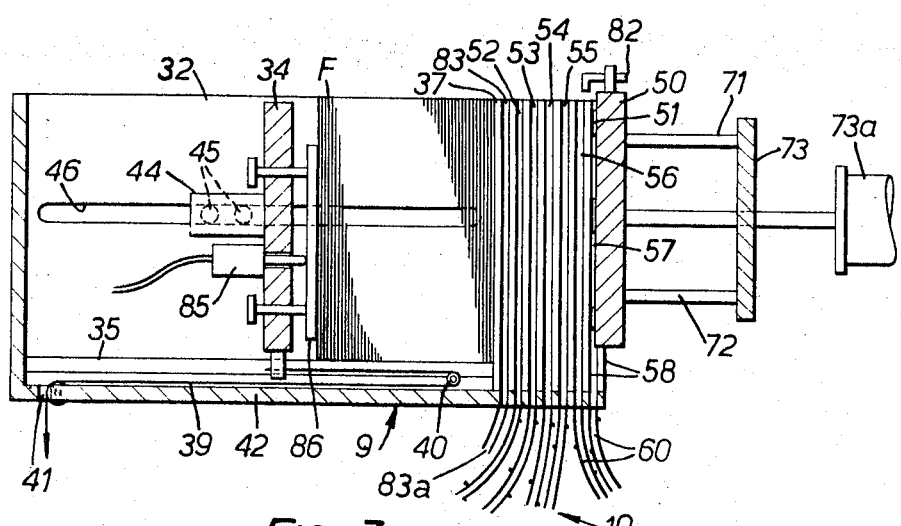
FIG. 3 is a vertical section through the foil feeder magazine on the line III—III of FIG. 4.
Figure 4:
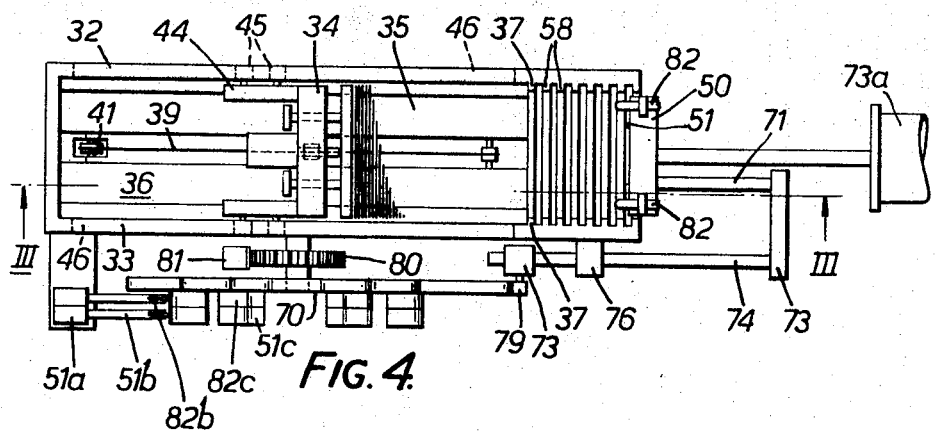
FIG. 4 is a plan view of the apparatus of FIG. 4.
Figure 9:
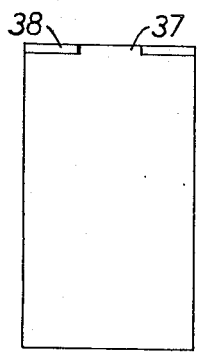
FIGS. 9 to 11 show a side view of a deformed foil having a locking configuration, an end view of that foil and an end view of that foil in a polygonal cavity.
Figure 10:
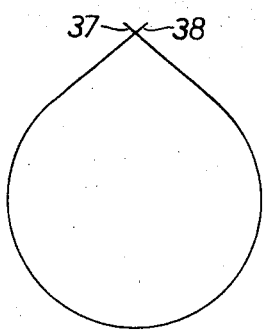
Figure 11:
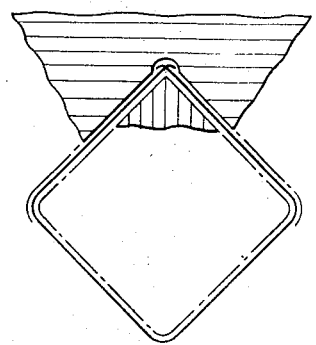

A problem with foil is to get the foil to settle against cavity walls when the walls are other than cylindrical or slightly conical. However, if the foil edges which are to be juxtaposed are cut as shown in FIG. 9 to provide a tongue 137 on one edge and a registering recess 138 on the other, then the foil can be guided along a cavity, initially generally cylindrical, such as already described, in the attitude shown in FIG. 10, into a region of the cavity which is polygonal, e.g. square, if necessary with a suitable transition zone, without the abutting edges moving out of abutting relationship. In FIG. 11 a foil is shown which has moved from a cylindrical cavity into a square tool cavity, if necessary the intermediate stage being provided by that region of the guide body cavity where the guide 23 of FIG. 2 is situated, such a guide being unnecessary where the interlocking type of foil is used. The interlocked edges will preferably lie in the corner of the container, as shown in FIG. 11, when the injected material will mask the interlock.

Figure 12:
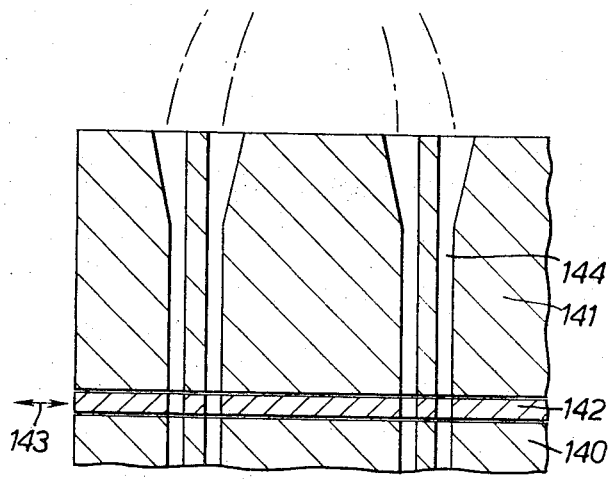
FIG. 12 is a foil gate mechanism.

It may be desirable to provide a preload facility and such is shown in FIG. 12. Here a guide body 140 as previously envisaged, includes a preload block 141 fed from the magazine. A gate 142 is movable as indicated by cam 143 to open the preload block passages 144 and allow foils in the preload block to drop down in to the passages 11 of the guide body, such motion of the gate being initiated for example by the tool arriving in the foil loading position as exemplified by FIG. 1, and to close the preload block to allow a further set of foils to be received ready for the next loading of the guide body.

Figure 13:
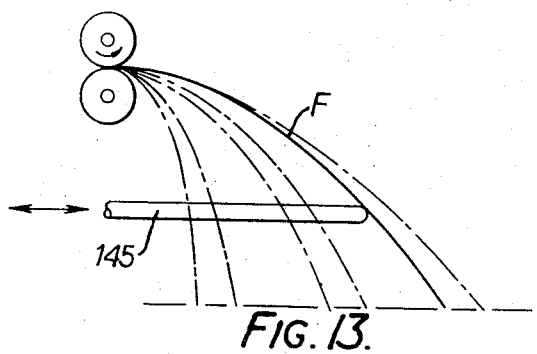
FIG. 13 is an alternative foil guide mechanism.

In FIG. 13 is shown a further foil guide arrangement. Here the foil is dispensed not by chute or wires but by relying on the gravitational pull on a foil dispensed for example horizontally. The foil F will droop and a guide finger 145 will control the droop and thereby direct the leading edge to the desired foil passage.

A seventh channel 83 and connected passageway 83a may be provided immediately adjacent the magazine. This channel 83 is intended to receive extra foils which may adhere to that piece picked up by member 50. As the member 50 withdraws a foil from between the pair of lips 37, any other foil adhering to this picked-up foil will tend to become detached, will remain in channel 83 and fall down the passageway 83a. Such pieces can be collected at intervals and reintroduced into the magazine.

The rods 15 may be moved into the cavities sequentially as a foil is received in the respective passage instead of simultaneously at the end of each feeding cycle as described.

It may be found that the use of a pair of magazines on each side of the machine would be advantageous, either to reduce wear and tear on the suction pick-up member drive mechanism or to obtain a faster rate of foil feed relative to the machine injection cycle time.

Such pairs of magazines may be arranged in tandem on each side of the machine with the leading foil of each facing the machine centre line, the two pick-up members of each pair of magazines being driven from a common cam in unison.

It may also in some circumstances be desirable to locate each magazine other than immediately above the guide block which it serves. In this case the guide wires may be replaced by guide surfaces which will guide the foil both by acting upon the major faces and on the foil minor or edge faces.

While the foil loading mechanism has been described with reference to a six impression moulding machine, it will be clear that it can be used with a single impression moulding machine or one making any suitable number of impressions.

What we claim is:

1. A foil loading mechanism comprising:
   a. a body forming the peripheral wall of a cavity for receiving and retaining a foil in distorted condition, said peripheral wall extending about an axis of said cavity and having an axially extending aperture through said peripheral wall;
   b. a guide means for positioning a foil exteriorly of said cavity with a part of a major face thereof overlying said aperture; and
   c. drive means operable on said foil part to drive the foil through said aperture into said cavity and across the same substantially transversely relative to the axis thereof.

2. A foil loading mechanism according to claim 1 in which said drive means comprises an actuator member.

3. A foil loading mechanism according to claim 2 in which said actuator member is disposed so as to engage that major face of a foil directed away from said aperture.

4. A foil loading mechanism according to claim 3 in which said actuator member carries foil centering projections.

5. A foil loading mechanism according to claim 1 in which said drive means comprise an air jet.

6. A foil loading mechanism comprising:
   a. a body forming the peripheral wall of a cavity for receiving and retaining a foil in distorted condition, said peripheral wall extending about an axis of said cavity, said cavity having an opening at one end and an axially extending, elongated aperture through said peripheral wall;

b. guide means for positioning a foil exteriorly of said cavity with a part of a major face thereof overlying said aperture;

c. drive means operable on said foil part to drive the foil through said aperture and into said cavity substantially transversely to the axis thereof; and d. ejector means operable to drive a foil axially of said cavity out of said open end of said cavity.

7. A foil loading mechanism according to claim 6 in which said ejector means comprise a pusher having parts which project into recesses in and extending axially of said peripheral wall of said cavity.

8. A foil loading mechanism according to claim 7 including a guide element projecting into said cavity to be engaged by juxtaposed edges of a foil during ejection of the foil from the cavity.

9. A foil loading mechanism according to claim 6 in which said drive means comprise an actuator member.

10. A foil loading mechanism according to claim 9 in which said actuator member is disposed so as to engage that major face of a foil directed away from said aperture.

11. A foil loading mechanism according to claim 10 in which said actuator member carries foil centering projections.

12. A foil loading mechanism according to claim 6 in which said drive means comprise an air jet.

13. A foil loading mechanism according to claim 1 in which said guide means include spaced foil engaging surfaces.

14. A foil loading mechanism according to claim 1 in which there are a plurality of said cavities, a foil magazine and a feeder mechanism movable between a foil pick-up station adjacent said magazine and a foil delivery station in respect of each guide means for each cavity.

15. A foil loading mechanism according to claim 14 in which said feeder mechanism comprises a head, a suction pad on said head, means biasing said head towards the magazine, a cam drive means to actuate said cam, a cam follower carried by said head to drive said head, said cam including lobes dimensioned to position said head successively at said different delivery stations.

16. A foil loading mechanism according to claim 15 in which said cam has cam surfaces engaged by followers respectively controlling valves in a line from said suction pad to a vacuum source and from a blower carried by said head to a pressure source, said blower being positioned to direct a foil toward a guide means at each delivery station.

17. A foil loading mechanism according to claim 16 in which a pusher in said magazine is biased towards said head, a thrust block being positioned ahead of said pusher in the direction of bias of the latter and a piston and cylinder means being provided between said thrust block and said pusher.

18. A foil loading mechanism according to claim 14 including a magazine for holding foils in superposed relationship, roller means for making frictional engagement with the lowermost foil in the magazine to present that foil to feed rollers, a pair of foil supports between which the roller means is located an which are independently movable to release the lowermost foil to one side of the roller means and then to the other side, and an angularly movable chute for feeding foils from said feed rollers successively to said guide means in respect of each cavity, wherein the roller means comprise one of two contacting rollers, the upper roller being rotatable to buckle the lowermost foil which, when clear of the upper roller, will under its inherent resilience spring the released foil edge into the bite of the two rollers.

19. A foil loading mechanism comprising:

a. body means forming the peripheral walls of a plurality of cavities each for receiving and retaining a foil in distorted condition, each peripheral wall extending about an axis of said respective cavity, said cavity having an opening at one end and an axially extending aperture through said peripheral wall;

b. guide means in respect of each cavity for positioning a foil exteriorly of said respective cavity into a part of a major face of the foil overlying said respective aperture;

c. drive means in response of each cavity operable on said foil part to drive the foil through said respective aperture and into said respective cavity transversely relative to the axis thereof;

d. ejector means in respect of each cavity operable to drive a foil axially of said respective cavity out of said open end of said cavity;

e. a magazine for foils; and f. a feeder mechanism movable between a foil pickup station adjacent said magazine and a foil delivery station in respect of each guide means for each cavity.

20. A foil loading mechanism according to claim 19 in which said drive means comprise an actuator member.

21. A foil loading mechanism according to claim 20 in which said actuator member is disposed so as to engage that major face of a foil directed away from said aperture.

22. A foil loading mechanism according to claim 21 in which said actuator member carries foil centering projections.

23. A foil loading mechanism according to claim 11 in which said drive means comprise an air jet.

24. The combination of a foil loading mechanism according to claim 6 and an injection moulding machine having a male tool and a pair of female tools each cooperable with the male tool to define a moulding cavity, the female tools being each movable transversely out of said machine and wherein said foil loading mechanism is positioned on one side of said machine to load one of said female tools with foils when said female tool is moved out of said moulding machine.

25. The combination of a foil loading mechanism according to claim 19 and an injection moulding machine having a male tool and a pair of female tools each cooperable with the male tool to define a plurality of moulding cavities equal in number to the cavities of the foil loading mechanism, the female tools being each movable transversely out of said moulding machine, and wherein said foil loading mechanism is positioned on one side of said machine to load one of said female tools with foils when said female tool is moved out of said moulding machine.

* * * * *